Dec. 17, 1968 P. E. KOPP 3,416,281
CLAY TILE BUILDING BLOCK WITH PASSAGEWAYS
Filed Nov. 8, 1966
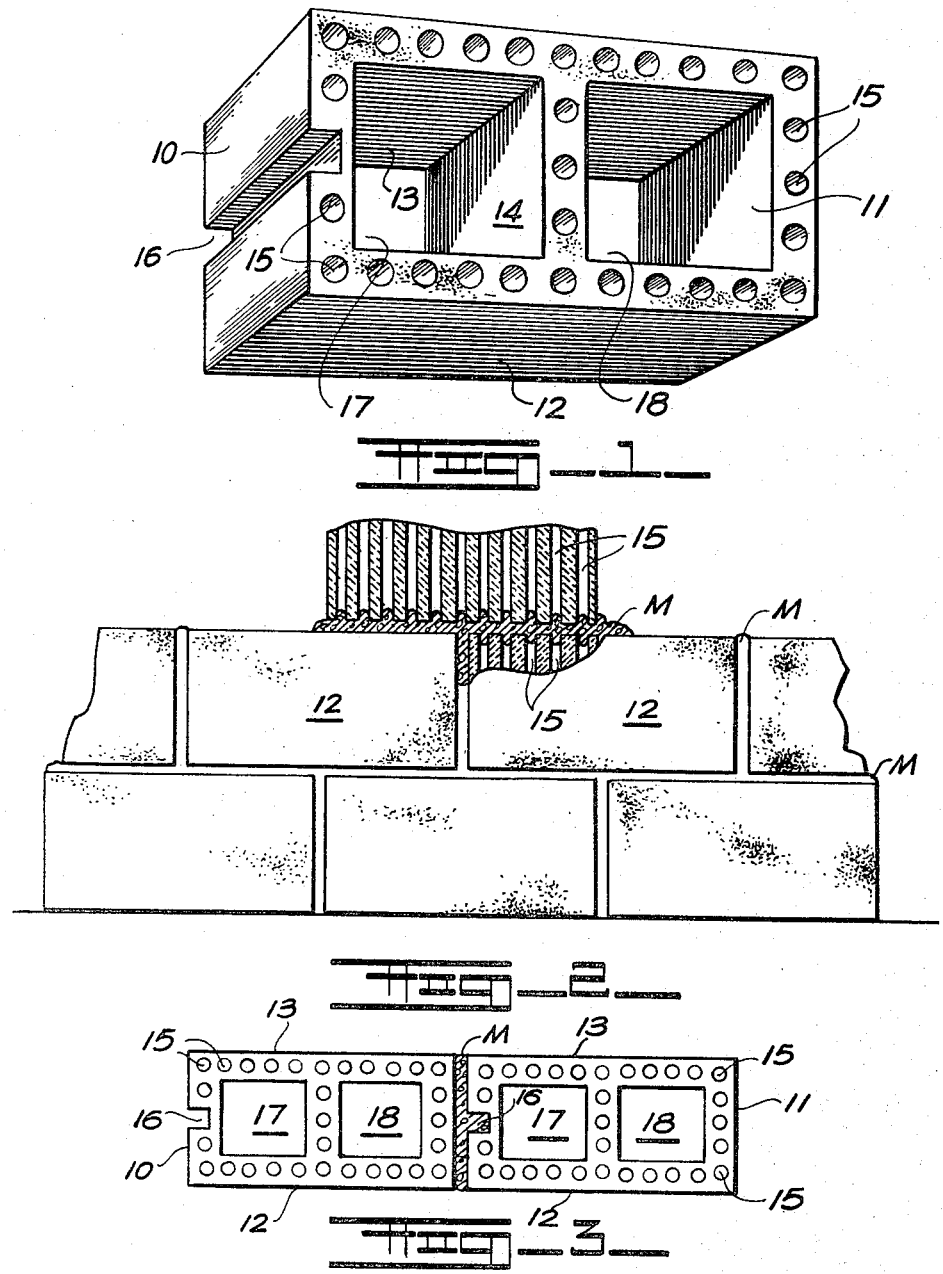
INVENTOR.
Philip E. Kopp
BY
W. B. Harpman
ATTORNEY.

United States Patent Office 3,416,281
Patented Dec. 17, 1968

3,416,281
CLAY TILE BUILDING BLOCK WITH
PASSAGEWAYS
Philip E. Kopp, 620 Ridgeleigh Drive,
Minerva, Ohio 44657
Filed Nov. 8, 1966, Ser. No. 592,938
1 Claim. (Cl. 52—606)

ABSTRACT OF THE DISCLOSURE

A clay tile building block that may be fired in a kiln without danger of distortion in shape or size due to the presence of a plurality of spaced parallel passageways extending vertically through the walls thereof.

This invention relates to a clay tile building block, and more particularly to a clay tile building block that resembles the concrete building block commonly used in the construction inductry, and has all of the advantages of the same and several improvements not found in concrete block.

The principal object of the invention is the provision of a clay tile building block that may be fired in a kiln without danger of distortion in shape or size. A further object of the invention is a provision of a clay tile building block that may be extruded as a continuous shape, cut off into desired sections and fired to produce a ceramic block having waterproof characteristics and the ability to receive and retain mortar when laid in a wall with a number of similar clay tile building blocks.

The clay tile building block disclosed herein incorporates a novel construction in providing a plurality of vertical passageways throughout the wall areas thereof, arranged with respect to location and size to facilitate the even heating and firing of the clay tile building block so as to insure its size and shape retention and the avoidance of warping or cracking, which would otherwise occur. Building blocks commonly used in the construction industry are formed of cocnrete and manufactured by mixing cement, sand and a suitable aggregate and pressing the resulting mixture into a mold where it is allowed to set and the block then removed and cured. The necessity of forming the block by pressing the concrete mixture into a mold, results in a generally porous wall construction, through which water will easily travel. When the blocks are laid in a foundation wall or building wall, for example, it is necessary to waterproof them to prevent water from passing therethrough, and when the waterproofing fails the wall has no inherent resistance to the passage of moisture. It has long been known that refractory building products possess waterproof characteristics, but it has heretofore been difficult to form building bolcks of refactory materials such as kiln fired clay, due to the characteristic shrinking and distortion which occurs in a clay product when it is fired. The present clay tile building block overcomes the difficulties heretofore experienced in attempting to form a building block as a fired ceramic unit by providing a plurality of carefully proportioned and positioned passageways vertically in the blocks in the side and end and partition walls thereof, so that all of the actual clay structure forming the block is capable of being uniformly heated when the block is fired, which results in no change of shape and no distortion, and thus produces an acceptable economical and highly practical building block having desirable characteristics for receiving and holding mortar used in laying up a wall from the clay tile building blocks and at the same time provides all of the waterproof advantages of a fired ceramic unit.

With the foregoing and other objects in view which will appear as the description proceeds, the invention resides in the combination and arrangement of parts and in details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective elevation of one of the clay tile building blocks.

FIGURE 2 is a section of a wall formed from clay tile building blocks, with parts broken away and parts in cross-section.

FIGURE 3 is a top plan view of a pair of the clay tile building blocks showing the same joined by suitable mortar.

By referring to the drawings, and FIGURE 1 in particular, it will be seen that the clay tile building block is formed of a pair of spaced end walls 10 and 11 and a pair of inter-connecting front and back walls 12 and 13, a transverse partition 14 joins the front and back walls 12 and 13, and all of the walls including the end walls 10 and 11, the front and back walls 12 and 13 and the partition 14 are provided with a plurality of equally sized, uniformly spaced vertical passageways 15—15. Still referring to FIGURE 1 of the drawings, it will be noted that the vertical passageways 15—15 which are illustrated as cross-sectionally circular but may be any desired shape, are so positioned that they permit the heat to flow therethrough and thus evenly heat the interiors of the wall sections during the firing of the clay tile building block. Of equal importance is the fact that these vertical openings provide unusually good mortar keying configurations in the upper and lower surfaces of the clay tile building block, and it will be observed that the complete walls including the end walls 10 and 11 and the front and back walls 12 and 13, and the intermediate partition 14, are considerably thicker than has heretofore been believed possible in a fired refractory product. These relatively thick walls provide wide areas on which the mortar may be positioned when the blocks are laid in a wall, and thus contribute to the successful formation of a desirable watertight mechanically sound and satisfactory wall construction.

The clay tile building block shown in FIGURE 1 of the drawings has a vertical channel 16 in the end thereof indicated by the numeral 10, and this additionally forms a keyway in which mortar may be positioned and acts to insure that the clay tile building blocks when laid in end to end relation in a wall, will not move from the desired position. It additionally contributes to the firing of the clay tile building block and of course provides a window receiving channel when blocks are laid with the channels in end to end relation so that a window sash may be positioned therein, as will be understood by those skilled in the art.

By referring now to FIGURE 2 of the drawings, a portion of a wall as in a foundation or wall of a building construction may be seen, and it will be seen that a plurality of the clay tile building blocks are shown joined by mortar M, and that in the uppermost portion of FIGURE 2 portions of the clay tile building blocks have been broken away into the area of the plurality of vertical openings 15 so that the mortar M forms vertically upstanding and depending portions in oppositely disposed relation engaging the ends of the passageways 15. Again the interlocking relation of the mortar and the blocks will be obvious to those skilled in the art, and it will be seen that the vertical passageways 15 in the walls of the building block are closed by the mortar when the block is laid in a wall.

The clay tile building block includes the customary enlarged vertical passageways 17 and 18 which are so positioned that they will communicate one with another when the blocks are laid in the usual staggered relation as seen, for example, in FIGURE 2 of the drawings.

By referring now to FIGURE 3 of the drawings, two of the clay tile building blocks may be seen laid in end to end relation with the mortar M forming the bond between the adjacent end surfaces thereof, the end 11 of the block on the left of FIGURE 3 joining the end 10 of the block on the right of FIGURE 3, with the mortar extending into the channel 16 and forming a vertical key relative to said channel.

It will thus be seen that a clay tile building block has been disclosed which has the unique characteristics of providing thick suitable mortar receiving walls and passageways extending through said walls acting to form interlocking configurations in the mortar applied to the walls when the blocks are laid in a wall, and that the passageways enable the clay tile building block to be fired and thereby produced efficiently and economically without warpage or distortion, which would otherwise occur with wall areas as thick as those required in a building block construction. It will thus be seen that a clay tile building block meeting the several objects of the invention has been disclosed, and having thus described my invention, what I claim is:

1. A clay tile building block consisting of a rectangular unit having spaced end walls and interconnecting spaced front and back walls defining a vertical passageway, all of said walls having a plurality of equal sized, uniformly spaced parallel passageways extending therethrough from the top to the bottom of said clay tile building block, and positioned so that the areas of said walls between said passageways is not substantially greater than the area of said passageways themselves; whereby said clay tile building block may be fired to produce a building block free of distortion or warping; and wherein the ends of said parallel passageways form mortar receiving means in the upper and lower surfaces of said building block, a transverse partition dividing said vertical passageway, a plurality of equal sized, uniformly spaced parallel passageways extending through said transverse partition from the top to the bottom of said clay tile building block; said end walls, front and back walls and said transverse partition are relatively thick so as to provide a wide mortar receiving surface; said spaced parallel passageways therethrough being of a size approximating one-half the thickness of said relatively thick walls and partition; one of said spaced parallel passageways in said transverse partition being positioned in the transverse medial portion thereof, an exterior vertical groove in the transverse medial portion of at least one end wall, said groove having a width at least equal to the width of the spaced parallel passageways and extending into said end wall more than half the thickness thereof.

References Cited

UNITED STATES PATENTS

| 1,385,299 | 7/1921 | Bilque | 52—606 X |
| 1,419,713 | 6/1922 | Bevier | 52—606 |
| 1,683,441 | 9/1928 | Bone | 52—606 X |

FOREIGN PATENTS

| 434,127 | 8/1935 | Great Britain. |
| 549,178 | 10/1956 | Italy. |

FRANK L. ABBOTT, *Primary Examiner.*

A. C. PERHAM, *Assistant Examiner.*

U.S. Cl. X.R.

52—439